United States Patent [19]

Machida et al.

[11] Patent Number: 4,862,330

[45] Date of Patent: Aug. 29, 1989

[54] VEHICLE LAMP

[75] Inventors: Tsutomu Machida; Toshiyasu Mochizuki; Masaru Sasaki, all of Shizuoka, Japan

[73] Assignee: Koito Manufacturing Co., Ltd., Tokyo, Japan

[21] Appl. No.: 247,012

[22] Filed: Sep. 21, 1988

[30] Foreign Application Priority Data

| Sep. 21, 1987 [JP] | Japan | 62-235026 |
| Sep. 21, 1987 [JP] | Japan | 62-142929[U] |
| Jun. 17, 1988 [JP] | Japan | 63-148323 |

[51] Int. Cl.$^4$ ............................................. B60Q 1/26
[52] U.S. Cl. ................................. 362/61; 362/244;
362/291; 362/336; 362/340; 362/800; 362/80
[58] Field of Search ............... 362/61, 80, 219, 244,
362/291, 336, 339, 340, 800

[56] References Cited

U.S. PATENT DOCUMENTS

| 516,824 | 3/1894 | Knowles | 362/244 |
| 1,478,681 | 12/1923 | Soderberg | 362/339 |
| 3,716,710 | 2/1973 | Clostermann et al. | 362/339 |
| 3,761,957 | 9/1973 | Jarrett | 362/339 |
| 3,988,609 | 10/1976 | Lewin | 362/339 |
| 4,234,906 | 11/1980 | Schindler | 362/339 |
| 4,389,698 | 6/1983 | Cibie | 362/61 |
| 4,488,208 | 12/1984 | Miller | 362/339 |
| 4,574,338 | 3/1986 | Takasaki et al. | 362/61 |
| 4,733,335 | 3/1988 | Serizawa et al. | 362/80 |

FOREIGN PATENT DOCUMENTS

| 1161771 | 1/1984 | Fed. Rep. of Germany | 362/336 |
| 6160328 | 12/1984 | Japan | 362/80 |

Primary Examiner—Ira S. Lazarus
Assistant Examiner—David G. Messer
Attorney, Agent, or Firm—Sughrue, Mion, Zinn, Macpeak & Seas

[57] ABSTRACT

A stop lamp for a vehicle, such as a stop lamp adapted for mounting on a rear spoiler of an automobile, having an improved efficiency of light utilization. The lamp includes a lamp body, a front lens, and a plural number of light-emitting diodes juxtaposed at predetermined intervals. Light control parts are formed in the inner wall of the front lens for directing the light output from the light-emitting diodes in predetermined directions. Each light control part is composed of nine prisms arranged in a 3×3 matrix. The central one of the prisms faces a respective one of the light-emitting diodes.

13 Claims, 10 Drawing Sheets

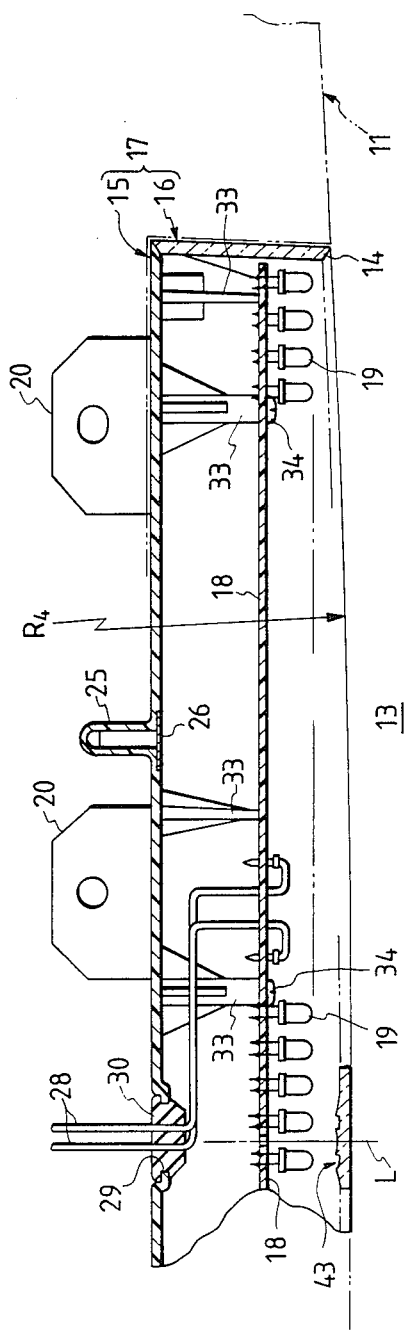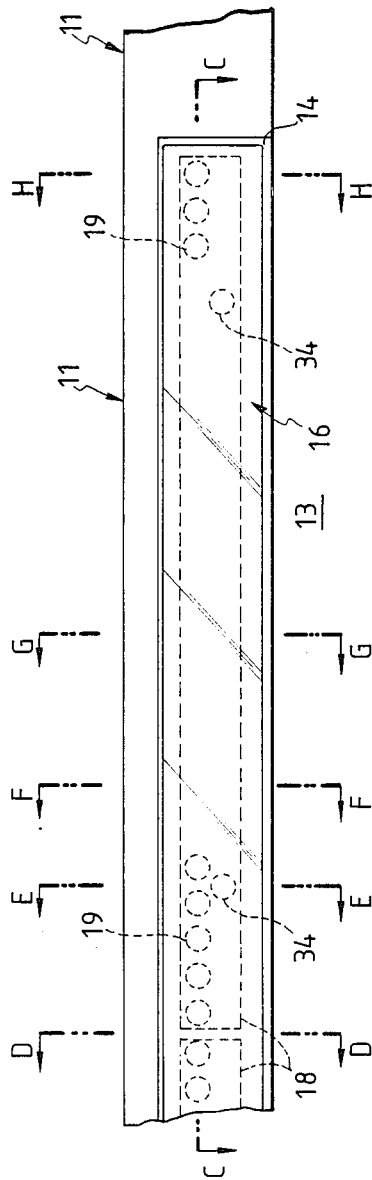

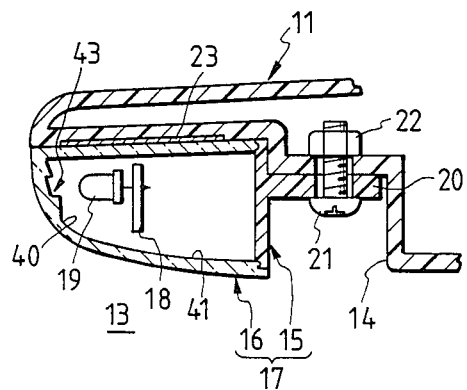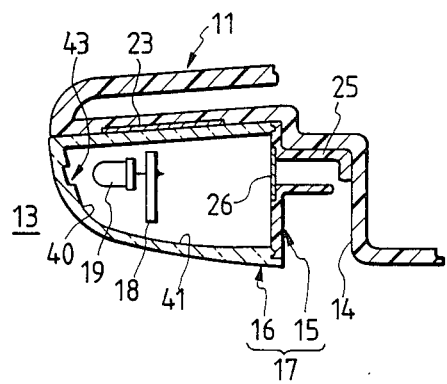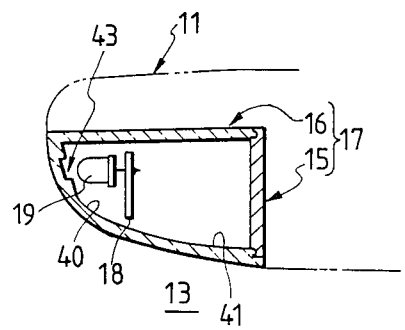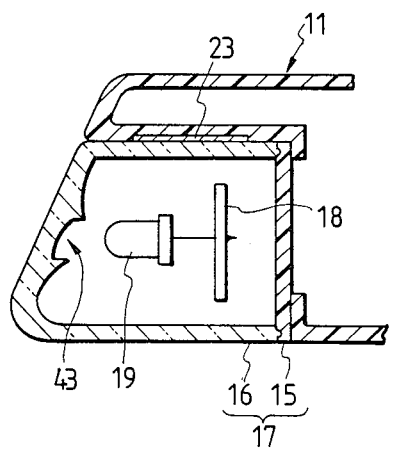

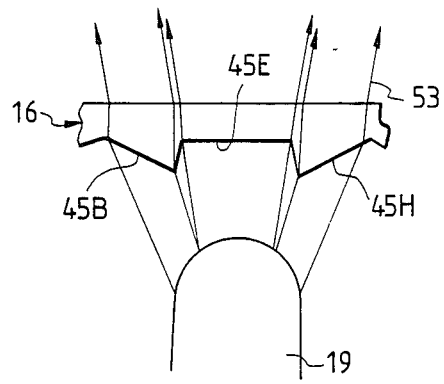
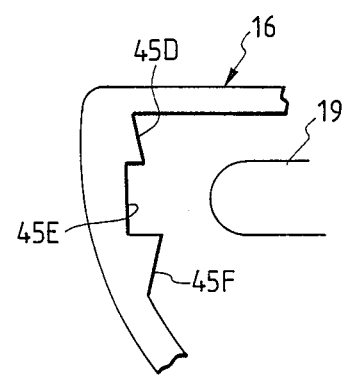
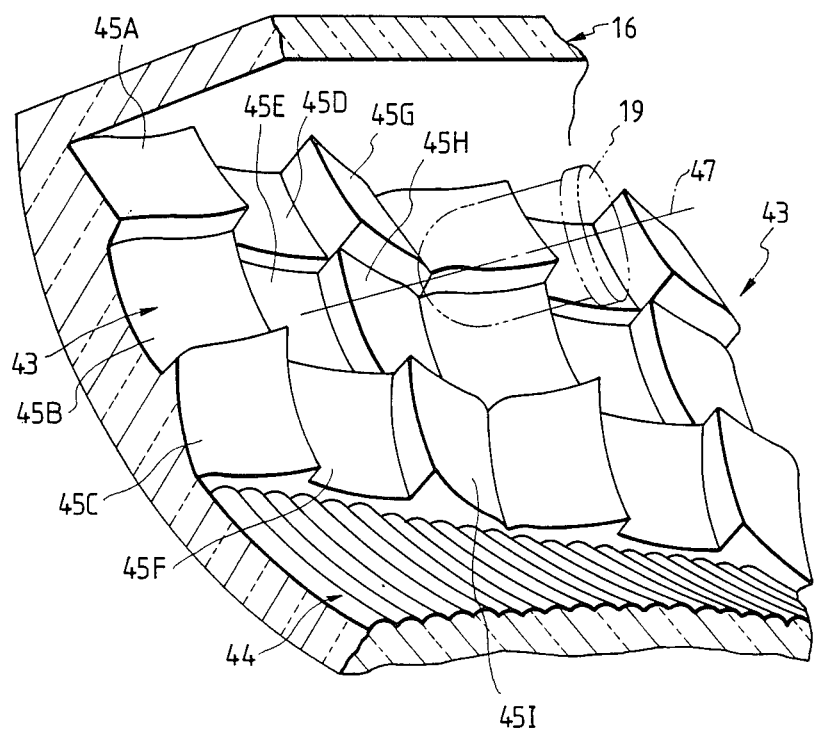

VEHICLE LAMP

BACKGROUND OF THE INVENTION

The present invention relates to a vehicle lamp which can be employed suitably as a stop lamp of a type generally referred to as a "high mount" stop lamp or the like which is mounted on the rear part of a vehicle body and which is used to give a warning light signal to the following vehicle when braking.

In recent automobiles, as shown in FIG. 22, a stop lamp 3 is fitted in a protruding rear end portion of a rear spoiler 2 mounted on the upper surface of the rear part of a vehicle body 1, whereby during braking the stop lamp 3 is turned on to give a warning light signal to the following vehicle to prevent an accident or collision. (See Japanese Unexamined Published Utility Model Applications Nos. 190779/1986 and 190780/1986.) The rear spoiler 2, which is provided to decrease the lift of the rear part of the vehicle body to thereby improve the road performance of the vehicle, is elongated laterally of the vehicle body and is wing-shaped in section. Accordingly, the stop lamp 3 has a lamp unit which is belt-shaped so that it can be fitted in an elongated recess formed in the protruding rear end portion of the rear spoiler 2. A number of light-emitting diodes are employed in the lamp unit as light sources.

In the conventional stop lamp of this type, the front and rear surfaces of the front lens forming the lamp body are planar. Therefore, the control of the direction of the emitted light is generally insufficient. That is, the rays of light emitted from the light emitting diodes, after passing through the front lens, extend rearward of the vehicle body in all directions, obliquely upward, obliquely downward, sideward, etc. That is, the larger part of the emitted light is wasted, making the stop lamp insufficient in luminance when viewed from behind the vehicle body.

In order to overcome this difficulty, a stop lamp has been proposed in which inner lenses are arranged inside the front lens to control the direction of the emitted light. However, the stop lens is still disadvantageous in that, due to the presence of the inner lenses, the number of components and the number of manufacturing steps are increased as much, and the stop lamp is high in manufacturing cost.

Accordingly, an object of this invention is to provide a vehicle lamp in which the above-described difficulties accompanying a conventional vehicle lamp such as a stop lamp have been eliminated, and the directions of the emitted light are controlled by a simple construction, whereby the illumination effect is improved.

SUMMARY OF THE INVENTION

The foregoing and other objects of the invention have been achieved by the provision of a vehicle lamp which, according to the invention, has a lamp unit comprising: a lamp body; a front lens; and a plural number of light-emitting diodes juxtaposed therein a predetermined intervals, and in which a number of light control parts each comprising nine prisms arranged in a 3×3 matrix are formed in the inner wall of the front lens in such a manner in correspondence with respective light-emitting diodes to direct the output light beams of the light-emitting diodes in predetermined directions, wherein in each of the light control parts the central of the nine prisms faces the respective light-emitting diode.

In the vehicle lamp of the invention, each of the light control parts formed in the inner wall of the front lens refracts the output light beam of the respective light-emitting diode to direct it in a predetermined direction, which reduces the quantity of light which is wasted in other directions.

BRIEF DESCRIPTION OF THE DRAWINGS

FIG. 4 is a sectional view taken along a line C—C in FIG. 5;

FIG. 5 is a front view showing essential components of the stop lamp;

FIG. 8 is a sectional view taken along a line F—F in FIG. 5;

FIG. 9 is a sectional view taken along a line G—G in FIG. 5;

FIG. 10 is a sectional view taken along a line H—H in FIG. 5;

FIG. 11 is a sectional view showing another example of the front lens of a stop lamp of the invention;

FIG. 12 and 13 are respectively a horizontal sectional view and a vertical sectional view showing a second example of the light control part;

FIGS. 14, 15 and 16 are respectively a perspective view, a horizontal sectional view and a vertical sectional view showing a third example of the light control part;

DESCRIPTION OF THE PREFERRED EMBODIMENTS

Preferred embodiments of the invention will be described in detail with reference to the accompanying drawings.

Figure 1:
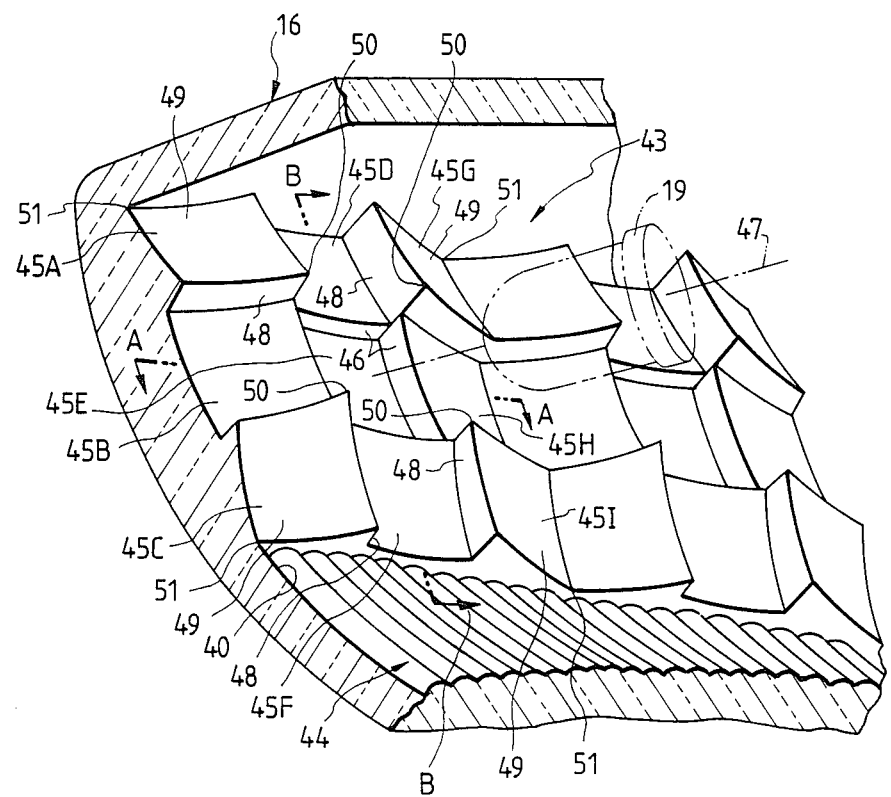
FIG. 1 is an enlarged perspective view showing essential parts of a first example of a light control part in a stop lamp coupled to a rear spoiler to which the technical concept of this invention is applied.
Figure 2:
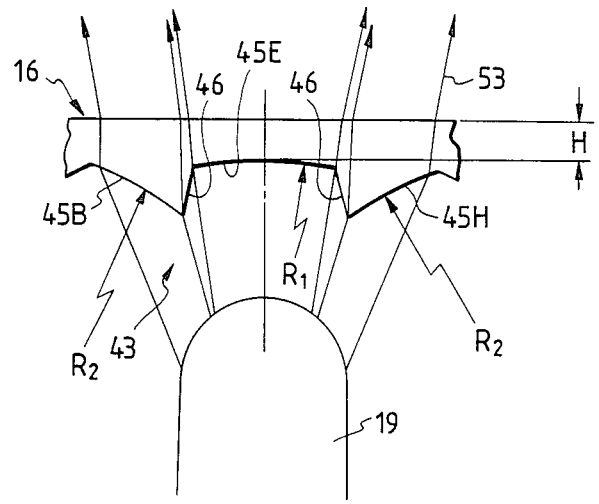
FIG. 2 is a sectional view taken along a line A—A in FIG. 1.
Figure 3:
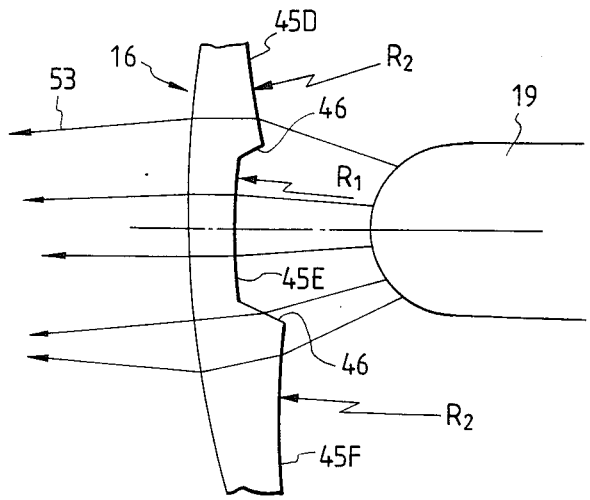
FIG. 3 is a sectional view taken along a line B—B in FIG. 1.
Figure 6:
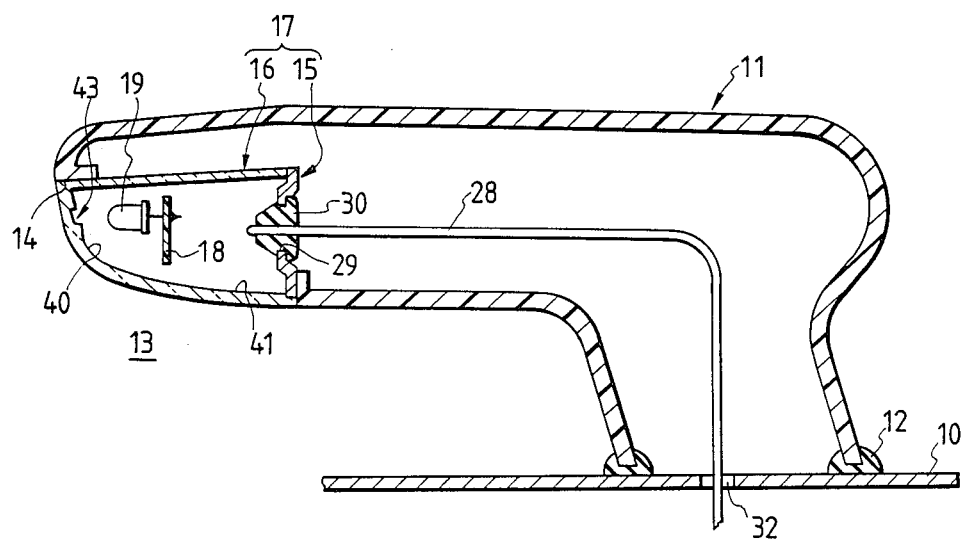
FIG. 6 is a sectional view taken along a line D—D in FIG. 5.
Figure 7:
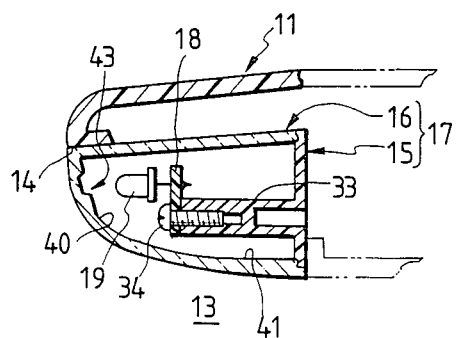
FIG. 7 is a sectional view taken along a line E—E in FIG. 5.

FIG. 1 is an enlarged perspective view showing essential parts of a first example of a light control section in a stop lamp incorporated in a rear spoiler to which the technical concept of the invention is applied. FIG. 2 is a sectional view taken along line a A—A in FIG. 1. FIG. 3 is a sectional view taken along line a B—B in FIG. 1. FIG. 4 is a sectional view taken along a line C—C in FIG. 5. FIG. 5 is a front view showing essential parts of the stop lamp. FIG. 6 is a sectional view taken along a line D—D in FIG. 5. FIG. 7 is a sectional view taken along a line E—E in FIG. 5. FIG. 8 is a sectional view taken along a line F—F in FIG. 5. FIG. 9 is a sectional view taken along a line G—G in FIG. 5. FIG. 10 is a sectional view taken along a line H—H in FIG. 5.

First, the construction of the rear spoiler and the stop lamp will be briefly described with reference to FIGS. 4 through 10. In these figures, reference numeral 10 designates the upper surface of the rear part of a vehicle body; 11, the rear spoiler which is mounted through a gasket 12 on the upper surface 10 of the rear part of the vehicle body; and 13, the stop lamp fitted in an elongated recess 14 having a predetermined length and which is formed in the lower part of the rear spoiler's protruding rear end portion at the middle. The rear spoiler 11 is laterally elongated and wing-shaped. The stop lamp 13 is also laterally elongated and is belt-shaped. The stop lamp 13 has a lamp unit 17 which includes a plate-shaped lamp body 15 and a front lens 16 which is substantially U-shaped in longitudinal section and open forward of the vehicle body and has its open end secured to the front (on the rear side of the vehicle) of the lamp body 15, for instance, by ultrasonic welding. A printed circuit board 18, to which a number of light-emitting diodes 19 are connected, is built into the lamp unit 17.

As shown in FIGS. 4 and 8, a plurality of fixing pieces 20 extend from the rear surface of the lamp body 15 forward of the vehicle body, and are fixedly secured to the top surface of the recess 14 with bolts 21 and nuts 22. The upper surface of the front lens 16 is secured to the top surface of the recess 14 with a pressure sensitive adhesive double-sided tape 23 (FIG. 8), an adhesive or the like. Communication tubes 25 (FIGS. 4 and 9) for communicating the inside of the lamp body 15 with the inside of the rear spoiler 11 protrude from the rear surface of the lamp body 15 at selected positions, and their ends are bent downward for prevention of the entrance of rain or water. The inside of the lamp unit 17 is communicated with the outside through the communication tubes 25 so that air flows freely into the lamp unit 17 and the inside of the lamp unit 17 is substantially equal in temperature and humidity to the outside atmosphere. This prevents or eliminates the formation of water droplets and variations of temperature or pressure which otherwise could be caused when the light-emitting diodes 19 are turned on and off. A filter 26 (FIGS. 4 and 9) is disposed on the inner open end of each of the communication tubes 25. The filter 26, being made of a porous film of fluoro-based material, polyethylene, macromolecular polyethylene or acrylic material, is high in moisture permeability, water resistance, and especially in gas permeability.

A lead-wire lead-out hole 29 is formed in the elongated lamp body 15 at the middle in order to lead a lead wire 28 into the rear spoiler 15 (FIGS. 4 and 6). A rubber bushing 30 is fixedly fitted in the lead-out hole 29. One end of the cord 28 is connected to an electrical circuit on the printed circuit board 18, and the other end is passed through the inside of the rear spoiler 11 and an inserting hole 32 formed in the upper rear wall 19 of the vehicle body into the inside of the vehicle body (FIG. 6). A plurality of board mounting parts 33 (FIGS. 4 and 7) extend forward from the front surface of the lamp body 15, and the above-described printed circuit board 18 is secured to the end faces of the board mounting parts 33 with retaining screws 34 in such a manner that the printed circuit board 18 is held substantially vertical. The light-emitting diodes 19 are arranged in a line at predetermined intervals on the front surface of the printed circuit board 18 in such a manner that the optical axes 47 (FIG. 1) thereof are substantially horizontal and are substantially parallel to the longitudinal central axis of the vehicle body.

The front lens 16, which is in the form of a laterally elongated box, is made of a transparent resin colored red or yellow. The inner plate 40 of the elongated box-shaped front lens 16, which faces the light-emitting diodes 19, are inclined rearward of the vehicle body and curved with a certain curvature, merging with the bottom plate 41. However, the inner plate 40 may be inclined toward the front of the vehicle body as shown in FIG. 11. Light control parts 43 according to the invention are formed in the upper end portion of the inner plate 40 for the light-emitting diodes 19 (FIGS. 1 through 3), and a side step 44 in the lower end portion.

The light control parts 43 act to direct the output light beams of the light-emitting diodes 19 rearward of the vehicle body so as to improve the visibility of the stop lamp 13. Each of the light control parts 43 is composed of nine square prisms 45A through 45I which are substantially the same in size and are arranged in a 3×3 matrix with the center of the central prism 45E substantially in alignment with the center of the respective light-emitting diode 19. The central prism 45E has a concave surface with a predetermined curvature ($R_1$) as shown in FIGS. 2 and 3. Each of the four prisms 45B, 45D, 45F and 45H located beside the central prism 45E has a step 46 along its inner edges formed by allowing the prism to set forward from the central prism 45E. The four prisms 45B, 45D, 45F and 45H are smaller in thickness towards the outer edge. Accordingly, the two right and left prisms 45B and 45H are substantially triangular and symmetrical in horizontal section as shown in FIG. 2, and the remaining two prisms 45D and 45F are substantially triangular in vertical section. In the case where the front plate of the front lens 16 is inclined rearward of the vehicle body, the step 46 of the lower prism 45F has a greater height than the upper prism 45D. In the case where the front plate of the front lens 16 is inclined forward of the vehicle body as shown in FIG. 11, the step 46 of the lower prism 45F is made smaller in height than that of the upper prism 45D. As shown best in FIG. 1, the steps of the right and left prisms 45H and 45B have a greater height than the upper prism 45D and smaller height than the lower prism 45F. The four prisms 45B, 45D, 45F and 45H have concave surfaces with a predetermined curvature ($R_2$).

The four prisms 45A, 45C, 45G and 45I located at four corners of the central prism 45E have also steps 48 which are formed by allowing these four prisms to set forward from the above-described four prisms 45B, 45D, 45F and 45H. The four prisms 45A, 45C, 45G and 45I at the corner of the central prism 45E have respective concave surfaces 49, each of which is curved with a predetermined curvature while being inclined from its inner corner 50 closer to the central prism 45E towards the outer corner 51 diametrically opposite to the inner corner 50. Therefore, the four prisms 45A, 45C, 45G and 45I are minimum in thickness at the outer corner 51 and maximum at the inner corner 50, and are substantially triangular both in vertical section and in horizontal section. In FIG. 2, reference character H designates the reference thickness of the front lens 16.

The prisms 45A through 45I (except the central prism 45E), having different step heights and different radii of curvature differ in the angle of refraction and in the direction of refraction, so that a light beam 53 from the light-emitting diode 19 is refracted in the direction of the optical axis 47, thus emerging from the front lens 16 rearward of the vehicle body.

In the above-described embodiment, the prisms 45A through 45I have concave surfaces with the predetermined curvatures. However, the invention is not limited thereto or thereby; that is, they can be modified in various manners as shown in FIGS. 12 through 17. In the modification shown in FIGS. 12 and 13, all the prisms 45A through 45I have planar surfaces, and the direction of refraction of the light beam 53 is substantially the same as in the above-described embodiment. In the modification shown in FIGS. 14 through 16, the surface of the central prism 45E is formed as concave surface curved gently with a predetermined curvature ($R_1$), and the surfaces of the remaining prisms 45A, 45B, 45C, 45D, 45F, 45G, 45H and 45I are S shaped in horizontal section in such a manner that they have a concave surface with a curvature $R_2$ close to the central prism and a convex surface with a curvature $R_3$ remote from the central prism.

Figure 15:
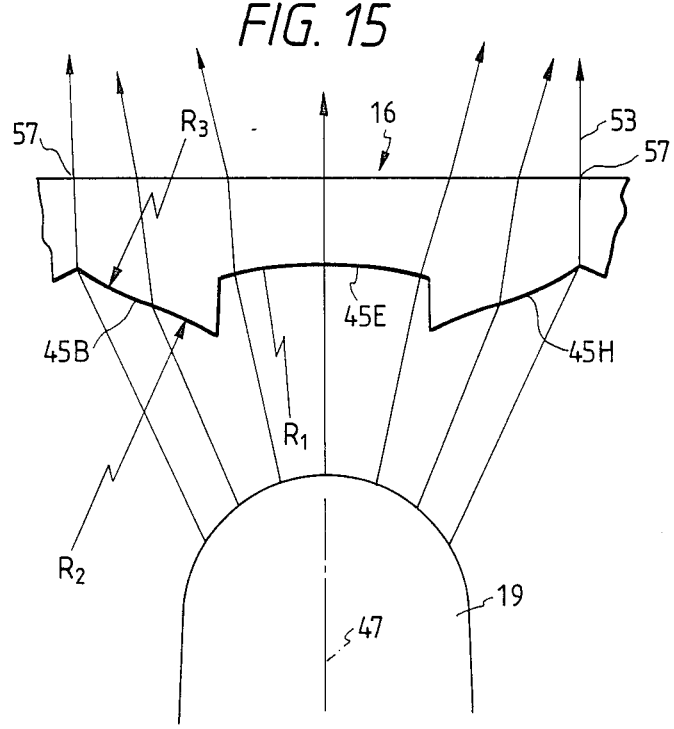
Figure 16:
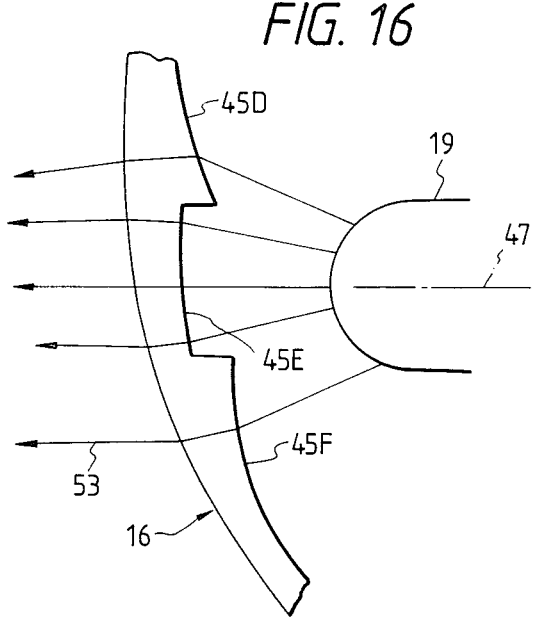

As is apparent from comparison with the directions of refraction in the cases of FIGS. 1 through 10 and FIGS. 12 and 13, in the case of FIGS. 14 through 16 the central prism 45E refracts the output light beam of the light-emitting diode 19 at a larger angle outward, i.e., in the direction of thickness, and the remaining eight prisms 45A, 45B, 45C, 45D, 45F, 45G, 45H and 45I refract the output rays of light of the light-emitting diode 19 at larger angle in the direction of thickness so that the rays of light are substantially parallel to the optical axis 47. Accordingly, the modification shown in FIGS. 14 through 16 is advantageous in that the light control parts 43 provide a large degree of light convergence and can illuminate the whole area more uniformly, especially the borders 57 between the light control parts 43, with the result that the formation of dark stripes is prevented, whereas the vehicle lamps shown in FIGS. 1 through 10 and in FIGS. 12 and 13 are still disadvantageous in that the light control parts 43 produce such great light diffusion that the central region is brighter than the peripheral region, that is, uniform illumination cannot be obtained.

Figure 17:
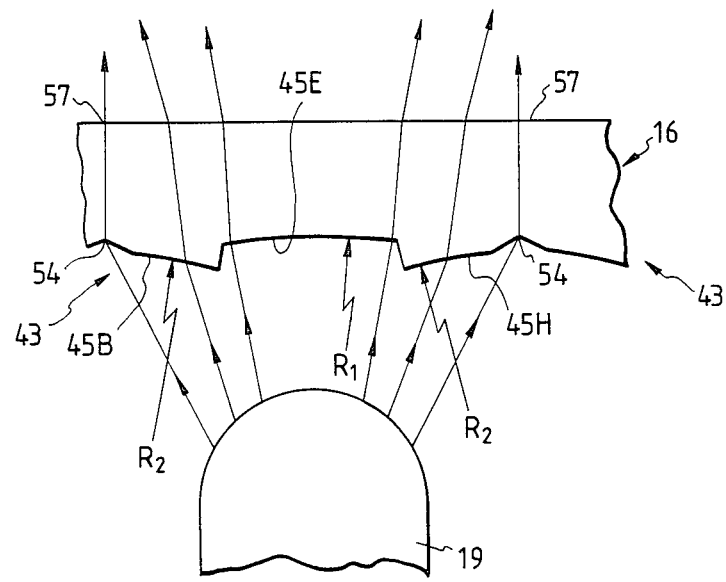
FIG. 17 is a horizontal sectional view showing a fourth example of the light control part.

Another example of the vehicle lamp according to the invention is as shown in FIG. 17. In the vehicle lamp, grooves 54 V shaped in section are formed in the surfaces of the borders between the light control parts 43 so that the borders are effectively illuminated, preventing the formation of dark stripes. Also, the metal mold for the part can be manufactured with ease. The other construction of the vehicle lamp is the same as that of the vehicle lamp shown in FIGS. 1 through 10.

Figure 18:
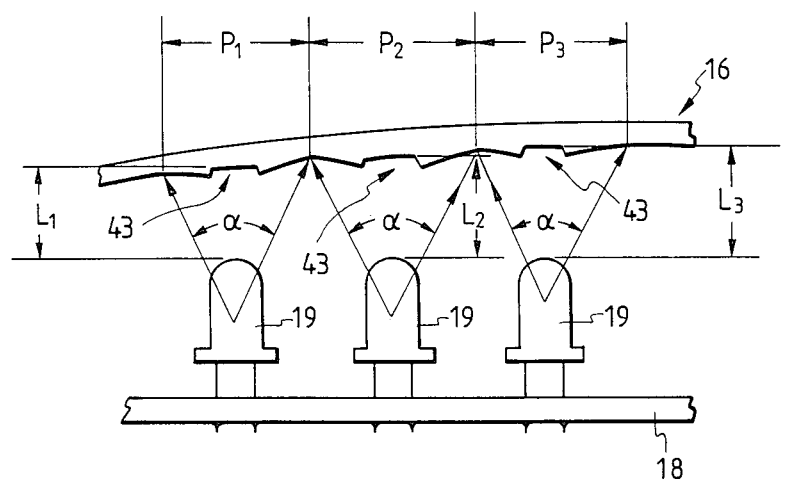
FIG. 18 is an explanatory diagram showing the positions of the light control parts and the distances between the light control parts and the respective light-emitting diodes.

As described above, the light control parts 43 are provided for corresponding ones of the light-emitting diodes 19, and, as shown in FIG. 4, the front plate of the front lens 16 is curved outward with a predetermined curvature ($R_4$) so that it is flush with the protruding rear end of the rear spoiler 11. Accordingly, the distances $L_1, L_2, L_3, \ldots$ between the light-emitting diodes 19 and the light control parts 43 are different as shown in FIG. 18, and therefore the widths $P_1, P_2, P_3, \ldots$ of the light control parts 43 are made different with the directivity of the light-emitting diodes 19 taken into account. In the vehicle lamp thus constructed, the output light beams of the light-emitting diodes 19 will not greatly overlap one another on the light control parts in the regions defined by the angle of diffusion of the light beams, and therefore advantageously the front lens 16 is uniformly bright in its entirety as viewed from front (i.e., from behind the vehicle body).

In the case where the front plate of the front lens 16 is planar and the distances between the front plate and the light-emitting diodes 19 are equal, the widths of the light control parts 43 are made equal.

The side step 44 formed in the lower end portion of the inner wall of the front lens 16 is constructed of a number of cylindrical lenses which extend longitudinally of the vehicle and are juxtaposed laterally of the vehicle to diffuse light beams laterally of the vehicle which are emitted downward from the light-emitting diodes 19. That is, by diffusion these beams the side step 44 makes unnoticeable rearward of the vehicle body the light which is emitted downward from the stop lamp 13 and reflected from the upper surface 10 of the rear part of the vehicle. Therefore, it is not always necessary to provide the side step 44.

Figure 19:
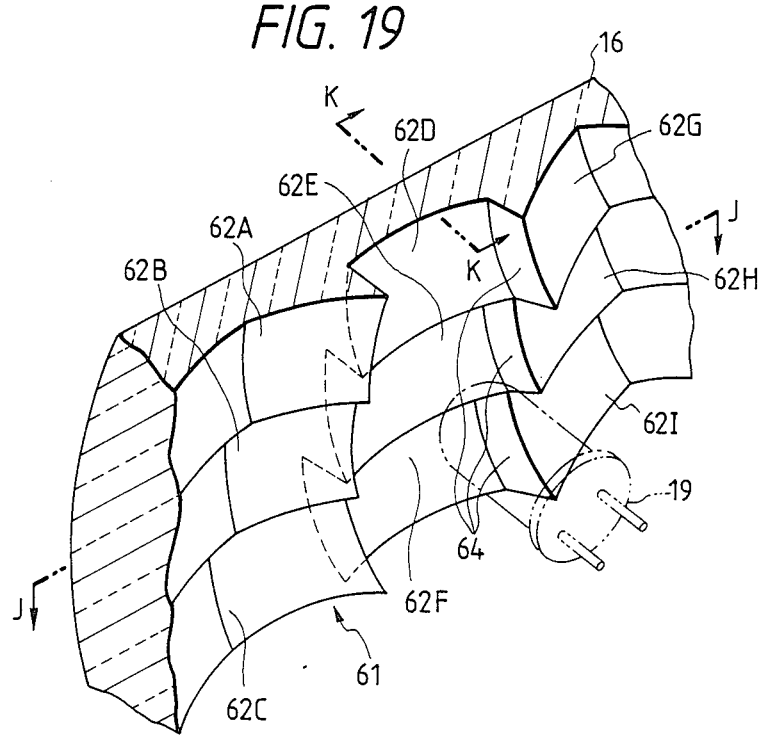
FIG. 19 is a perspective view showing a fifth example of the light control part.
Figure 20:
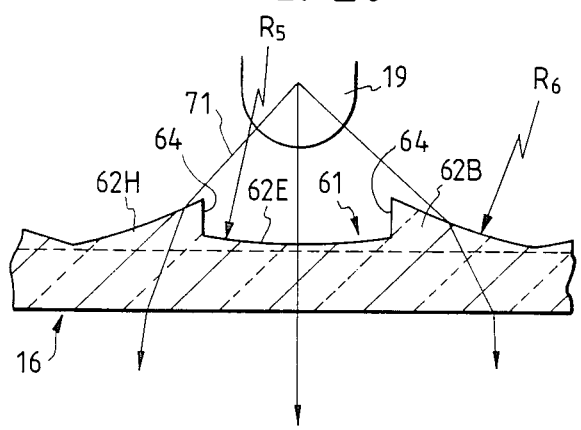
FIG. 20 and 21 are a sectional view taken along a line J—J in FIG. 19 and a sectional view taken along a line K—K in FIG. 19, respectively.
Figure 21:
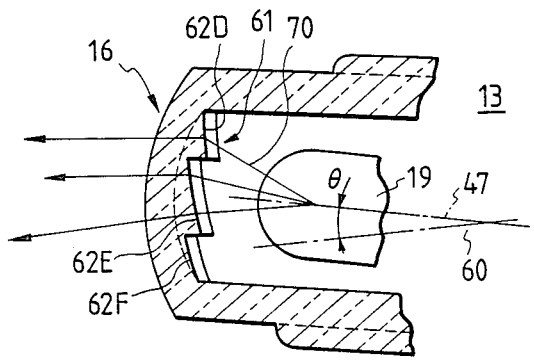
Figure 22:
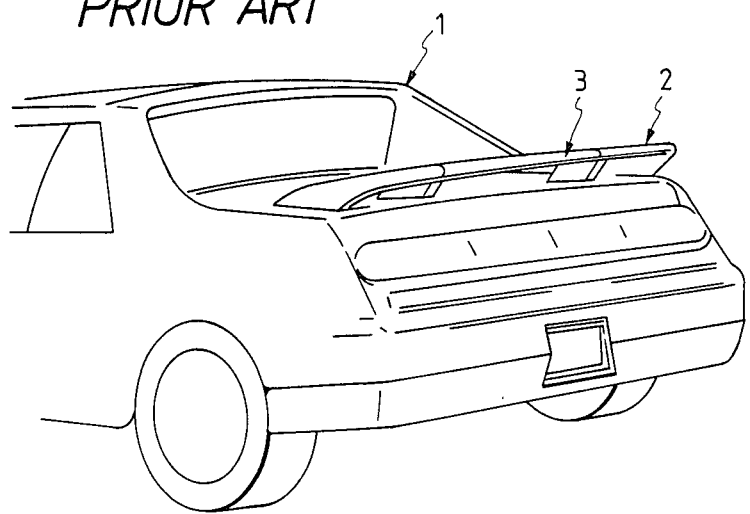
FIG. 22 is a perspective view showing an automobile with a rear spoiler which is coupled to a conventional stop lamp.

In the stop lamp 13 thus constructed, the light control parts 43 formed in the inner surface of the front plate of the front lens 16 refract the output light beams of the light-emitting diodes 19 towards the optical axes 47, respectively, so that the light beams are directed rearward of the vehicle body, and therefore the quantity of light emitted vertically or laterally of the vehicle body is reduced, i.e., the loss of light is decreased, and the visibility of the stop lamp is remarkably improved. Since the light control parts 43 are parts of the front lens 16, it is unnecessary to provide inner lenses therein, thereby reducing the total number of components and reducing the required number of manufacturing steps. FIGS. 19, 20 and 21 show another example of the light control part. More specifically, FIG. 19 is a perspective view showing the light control part, FIG. 20 is a sectional view taken along a line J—J in FIG. 19, and FIG. 21 is a sectional view taken along a line K—K in FIG. 19. In this embodiment, the protruding rear end portion of the rear spoiler is inclined downward at an angle Θ (for instance 10°), and the stop lamp 13 is fitted in the protruded rear end portion in such a manner that it is also inclined downward at the angle Θ, and accordingly the optical axis 47 of the light-emitting diode 19 forms the angle Θ with the horizontal line 60.

The light control parts 61 are formed in the inner wall of the front lens 16 in such a manner that they face respective ones of the light-emitting diodes 19. Each of the light control parts 61 is made up of nine prisms 62A through 62I which are arranged in a 3×3 matrix. The central prism 62E confronts the light-emitting diode 19. The three prisms 62D, 62E and 62F in the central column are substantially equal in configuration (triangular) in vertical section. Each of the prisms 62D, 62E and 62F is larger towards the lower edge, and the surface is curved inward with a predetermined curvature ($R_5$). The prisms 62A, 62B and 62C, and the prisms 62G, 62H and 62I arranged on both sides of the prisms 62D, 62E and 64F in the central column are symmetrical with each other. The prisms 62A, 62B and 52C, and the prisms 62G, 62H and 62I have steps 64 which are formed by allowing the inner edges to set forward from the prisms 62D, 62E and 62F in such a manner that the prisms 62A, 62B and 62C and the prisms 62G, 62H and 62I are smaller in thickness towards the outer edges. Therefore, the prisms 62A, 62B, 62C, 62G, 62H and 62I are substantially triangular in horizontal section, and their surfaces are curved inward with a curvature ($R_6$) which is substantially equal to that of the surfaces of the prisms 62D, 62E and 62F.

In the light control part 61 thus constructed, the light beams 70 applied to the prisms 62D, 62E and 62F in the central column by the light-emitting diode 19 are refracted downward, i.e., in the direction of thickness as shown in FIG. 14, so that they pass, as substantially parallel light beams, through the front lens 16, whereas the light beams applied to the prisms 62A, 62B and 62C in the left column and the prisms 62G, 62H and 62I are refracted inward, i.e., in the direction of thickness as shown in FIG. 20. Therefore, in this embodiment also, the light beams emitted from the light-emitting diode 19 vertically or laterally of the vehicle body can be made to advance rearward of the vehicle body, that is, the visibility of the stop lamp is significantly improved.

The angle of refraction of light; i.e., the direction of emitted light, can be freely controlled by changing the curvatures of the surfaces of the prisms 62A through 62I. Furthermore, the surfaces of the prisms may be modified to sloped plane surfaces similar to the case of FIGS. 12 and 13.

As described above, the vehicle lamp of the invention has light control parts formed in the inner-wall of the front lens in such a manner that each light control part is made up of nine prisms arranged in a 3×3 matrix so that the output light beams of the light-emitting diodes are directed in predetermined directions. Therefore, light which would otherwise be wasted is effectively utilized so that the visibility of the inventive vehicle lamp is markedly improved. Furthermore, since the light control parts are formed using the front lens itself, the number of components is not increased, and the vehicle lamp can be manufactured at low cost.

What is claimed is:

1. A lamp for a vehicle, comprising:
   a lamp unit comprising a lamp body, a front lens, and a plurality of light-emitting diodes juxtaposed at predetermined intervals; and
   a plurality of light control parts each comprising nine prisms arranged in a 3×3 matrix formed in an inner wall of said front lens in correspondence to each of the respective light-emitting diodes to direct output light beams of said light-emitting diodes in a predetermined direction, a central one of said nine prisms of each of said light control parts facing the respective light-emitting diode, and each of the four prisms adjacent said central one of said nine prisms having a step along inner edges thereof.

2. The vehicle lamp of claim 1, wherein each of said prisms is generally square shaped.

3. The vehicle lamp of claim 1, wherein said central one of said nine prisms has a concave surface.

4. The vehicle lamp of claim 1, wherein said four prisms adjacent said central one of said nine prisms are smaller in thickness towards outer edges thereof than towards inner edges.

5. The vehicle lamp of claim 1, wherein said front lens is inclined rearward of the vehicle body, and wherein a height of said step of a one of said four prisms below said central one of said nine prisms is larger than a height of said step of a one of said four prisms above said central one of said nine prisms.

6. The vehicle lamp of claim 1, wherein said front lens is inclined forwardly of the vehicle body, and wherein a height of said step of a one of said four prisms below said central one of said nine prisms is smaller than a height of said step of a one of said four prisms above said central one of said nine prisms.

7. The vehicle lamp of claim 5, wherein a height of said steps of the prisms to the right and left of said central one of said four prisms is larger than said one of said four prisms below said central one of said nine prisms and smaller than said one of said nine prisms above said central one of said nine prisms.

8. The vehicle lamp of claim 1, wherein the four prisms located at the four corners of said central one of said nine prisms have a concave surface and are inclined from an inner corner thereof closer to said central one of said nine prisms towards an outer corner thereof diametrically opposite to said inner corner.

9. The vehicle lamp of claim 1, wherein each of said nine prisms of each of said light control parts has a planar surface.

10. The vehicle lamp of claim 1, wherein a surface of said central one of said nine prisms has a concave surface and the remaining eight prisms are S shaped in horizontal sectional so as to have a concave surface close to said central one of said nine prisms and a convex surface remote from said central one of said nine prisms.

11. The vehicle lamp of claim 1, wherein V-shaped grooves are formed between adjacent ones of said light control parts.

12. The vehicle lamp of claim 1, wherein said front lens has formed therein a side step comprising a plurality of cylindrical lenses extending longitudinally of said vehicle.

13. A lamp for a vehicle, comprising:
   a lamp unit comprising a lamp body, a front lens, and a plurality of light-emitting diodes juxtaposed at predetermined intervals; and
   a plurality of light control parts each comprising nine prisms arranged in a 3×3 matrix formed in an inner wall of said front lens in correspondence to each of the respective light-emitting diodes to direct output light beams of said light-emitting diodes in a predetermined direction, a central one of said nine prisms of each of said light control parts facing the respective light-emitting diode, wherein said front lens is curved such that distances between ones of said light emitting diodes and distances between respective one of said light control parts are different from one another, and wherein widths of said light control parts are varied in accordance with a directivity of the respective ones of said light-emitting diodes.

* * * * *